US012103153B2

(12) United States Patent
Nagata

(10) Patent No.: US 12,103,153 B2
(45) Date of Patent: Oct. 1, 2024

(54) STAPLER

(71) Applicant: MAX CO., LTD., Tokyo (JP)

(72) Inventor: Tomokazu Nagata, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 17/720,894

(22) Filed: Apr. 14, 2022

(65) Prior Publication Data

US 2022/0331940 A1 Oct. 20, 2022

(30) Foreign Application Priority Data

Apr. 15, 2021 (JP) ................................ 2021-069384

(51) Int. Cl.
*B25C 5/02* (2006.01)

(52) U.S. Cl.
CPC ............ *B25C 5/0207* (2013.01); *B25C 5/025* (2013.01)

(58) Field of Classification Search
CPC ....... B25C 5/02; B25C 5/0207; B25C 5/0221; B25C 5/0235; B25C 5/0242; B25C 5/025; B27F 7/19
See application file for complete search history.

(56) References Cited

U.S. PATENT DOCUMENTS 200,774 A * 2/1878 Somers ................... B25C 5/025 493/385
212,316 A * 2/1879 McGill ..................... B27F 7/19 227/155
1,506,073 A * 8/1924 Maynard ................. B25C 5/025 227/155
1,836,944 A * 12/1931 Vogel .................... B25C 5/0207 227/124
6,209,772 B1 * 4/2001 Wang .................... B25C 5/1689 227/119
6,925,849 B2 * 8/2005 Jairam .................. B25C 5/0207 227/77
7,159,749 B2 * 1/2007 Tsai ...................... B25C 5/0207 227/79
7,621,433 B2 * 11/2009 Ivarsson ............... B25C 5/0207 227/154

(Continued)

FOREIGN PATENT DOCUMENTS

DE 1279641 B * 10/1968 ........... B25C 5/0207
DE 4434513 C1 * 8/1995 ........... B25C 5/0207

(Continued)

*Primary Examiner* — Joshua G Kotis
(74) *Attorney, Agent, or Firm* — Banner & Witcoff, Ltd.

(57) ABSTRACT

A stapler includes a staple striking-out unit, a staple leg bending unit, and a connector that connects the staple striking-out unit and the staple leg bending unit. The staple leg bending unit includes a clincher having a guide surface for bending the staple legs, and a clincher guide having a sandwiching portion. The clincher guide is configured to move in a first direction to displace a distance between the guide surface and the sandwiching portion. The clincher is capable of being located at a lower end position where the guide surface is farthest from the sandwiching portion in the first direction. The lower end position is a position where a tip ends of the staple legs are in contact with the guide surface and a gap is formed between an upper surface of the sheet sandwiched by the sandwiching portion and a staple shoulder portion of the staple.

5 Claims, 8 Drawing Sheets

(56) References Cited

U.S. PATENT DOCUMENTS

| | | | | |
|---|---|---|---|---|
| 7,621,434 | B2 * | 11/2009 | Sugihara | B25C 5/0207 227/154 |
| 7,757,923 | B2 * | 7/2010 | Huang | B25C 5/0242 227/135 |
| 7,938,306 | B2 * | 5/2011 | Sugihara | B27F 7/19 227/155 |
| 2007/0145093 | A1 * | 6/2007 | Matsukawa | B25C 5/0242 227/120 |
| 2010/0059568 | A1 * | 3/2010 | Leung | B25C 5/025 227/64 |
| 2010/0133315 | A1 | 6/2010 | Gustafsson et al. | |
| 2011/0062210 | A1 * | 3/2011 | Leung | B25C 5/0242 227/155 |
| 2011/0079625 | A1 * | 4/2011 | Huang | B25C 5/0207 227/120 |
| 2012/0175397 | A1 * | 7/2012 | Co | B25C 5/11 227/155 |
| 2013/0306700 | A1 * | 11/2013 | Chang | B25C 5/025 227/120 |
| 2014/0231487 | A1 * | 8/2014 | Abe | B25C 5/0285 227/129 |

FOREIGN PATENT DOCUMENTS

| | | | |
|---|---|---|---|
| JP | 2004-230482 | A | 8/2004 |
| JP | 5065411 | B2 | 10/2012 |

* cited by examiner

STAPLER

CROSS-REFERENCE TO RELATED APPLICATIONS

The present application claims priority from Japanese Patent Application No. 2021-069384 filed on Apr. 15, 2021, the entire content of which is incorporated herein by reference.

TECHNICAL FIELD

The present invention relates to a stapler configured to bind a sheet with a staple.

BACKGROUND ART

In a stapler configured to penetrate staple legs of a U-shaped staple through a sheet and to bend the legs on a back side of the sheet to thereby bind the sheet, a magazine configured to accommodate the staple, a handle part having a driver configured to strike out the staple accommodated in the magazine toward the sheet, and a clincher part having a clincher configured to bend the staple legs of the staple struck out from the magazine and penetrating through the sheet are rotatably supported at respective rear end portions thereof.

Known is a stapler configured to bind a sheet in a form called a flat clinch where after staple legs of a staple penetrate through the sheet, the staple legs are bent with being in close contact with a back surface of the sheet. As for the stapler configured to bind a sheet in a flat clinch form, suggested is a stapler including a clincher guide configured to support a sheet at an upper position with respect to a clincher until staple legs of the staple penetrate through the sheet, and a slide member configured to switch whether to actuate the clincher guide, wherein relative movement of the clincher guide and the clincher applies, to a pair of staple legs penetrating through the sheet, a force of bending the staple legs inwardly each other, thereby bending the staple legs from root portions of the staple legs penetrating through the sheet (for example, refer to PTL 1).

In the stapler called a flat clinch of the related art, a transmission member such as a link extends from a handle part to a clincher part extends between a position where the clincher is provided and a rear end portion where the handle part and the clincher pare are connected. For this reason, since the sheet cannot be inserted beyond the link toward the rear end portion, the stapler is not suitable for a stapler in a form called saddle stitching.

On the other hand, suggested is a stapler having a configuration where an L-shaped main body configured to rotate about a shaft as a fulcrum and having a slider function is pressed via a sheet (for example, refer to PTL 2). Such a stapler can implement flat clinch in a form of saddle stitching.

CITATION LIST

Patent Literature

PTL 1: JP-A-2004-230482
PTL 2: Japanese Patent No. 5,065,411

SUMMARY OF INVENTION

As a form of binding a sheet with a staple, a glasses-shaped clinch is such a form that staple legs of a staple are bent from root portions penetrating through the sheet and tip ends thereof are curved toward the sheet. When the sheet is bound in the form of a glasses-shaped clinch, a protrusion height, from the sheet, of the staple legs penetrating through the sheet increases. Therefore, when sheet bundles bound by the staples are stacked, a loading height increases. Further, as the stapler that implements saddle stitching, suggested is a stapler configured to bind a sheet in a form of such a glasses-shaped clinch. In the saddle stitching form, a portion to be a fold is bound with a staple. However, when the fold portion is bound in the form of a glasses-shaped clinch, the protrusion height, from the sheet, of the staple legs penetrating through the sheet increases, so that an appearance as a booklet is deteriorated.

In contrast, when a sheet is bound in the form of a flat clinch, a protrusion height, from the sheet, of the staple legs penetrating through the sheet is suppressed low. Therefore, even when sheet bundles bound by the staples are stacked, a loading height can be suppressed from increasing. However, the tip ends of the staple legs are likely to float from the sheet. For this reason, if the tip ends of the staple legs float at a time when the fold portion is bound in the form of a flat clinch, the appearance as a booklet is deteriorated.

The present invention has been made to solve such problems, and an object thereof is to provide a stapler capable of suppressing tip ends of staple legs binding a sheet from floating from the sheet.

According to an aspect of the present invention, there is provided a stapler including a staple striking-out unit configured to strike out a staple having a pair of staple legs and a staple shoulder portion connecting end portions of the pair of staple legs each other, a staple leg bending unit configured to bend the staple legs of the staple struck out by the staple striking-out unit, and a connection unit (connector) configured to connect the staple striking-out unit and the staple leg bending unit to be movable in directions of relatively coming close to and separating from each other. The staple leg bending unit includes a clincher having a guide surface for bending the staple legs, and a clincher guide having a sandwiching portion configured to sandwich a sheet between the sandwiching portion and the staple striking-out unit and an opening portion for exposing the guide surface to the sandwiching portion. The clincher guide is supported to be movable in a first direction along the directions and configured to move in the first direction to displace a distance between the guide surface and the sandwiching portion. The clincher is located at a lower end position where the guide surface is farthest from the sandwiching portion in the first direction, in a state where the staple struck out by the staple striking-out unit penetrates through the sheet sandwiched by the sandwiching portion and tip ends of the staple legs after penetration are in contact with the guide surface. The lower end position is a position where the tip ends of the staple legs are in contact with the guide surface and a gap is formed between an upper surface of the sheet sandwiched by the sandwiching portion and the staple shoulder portion of the staple. As the staple is further struck out, the pair of staple legs of the staple is bent inwardly, the staple shoulder portion comes into contact with the sheet and the staple shoulder portion is pressed together with the sheet in the first direction, so that the clincher guide moves in a direction in which the sandwiching portion comes close to the guide surface.

In the present invention, when the clincher guide moves in the first direction, the staple legs of the staple penetrating through the sheet are pressed against the guide surface of the clincher, and the respective tip ends-side of the pair of staple legs are applied with a force of bending the same inwardly.

When the staple legs of the staple are inserted into the sheet to the position where the staple shoulder portion of the staple comes into contact with the upper surface of the sheet, the bent portions first bent are exposed between the root portions and the tip ends of the staple legs protruding from the lower surface of the sheet. Further, the pair of staple legs pressed against the guide surface of the clincher is bent inwardly each other with the root portions protruding from the lower surface of the sheet as a fulcrum, and the curved portions of the staple legs are pressed and squashed. Thereby, the sheet is bound in such a form that the staple legs penetrating through the sheet are in close contact with the back surface of the sheet from the root portions protruding from the lower surface of the sheet to the bent portions and the farther tip ends-side than the bent portions face toward the lower surface of the sheet.

According to the present invention, the sheet is bound in such a form that the farther tip ends-side than the bent portions of the staple legs penetrating through the sheet face toward the lower surface of the sheet. Therefore, as compared to a form of the flat clinch, the tip ends of the staple legs can be suppressed from floating from the sheet. In addition, the staple legs penetrating through the sheet are in close contact with the back surface of the sheet from the root portions protruding from the lower surface of the sheet to the bent portions. Therefore, as compared to a form of the glasses-shaped clinch, the protrusion height, from the sheet, of the staple legs penetrating through the sheet can be suppressed low.

DESCRIPTION OF EMBODIMENTS

Hereinafter, embodiments of the stapler of the present invention will be described with reference to the drawings.

<Configuration Example of Stapler of Present Embodiment>

Figure 1A:
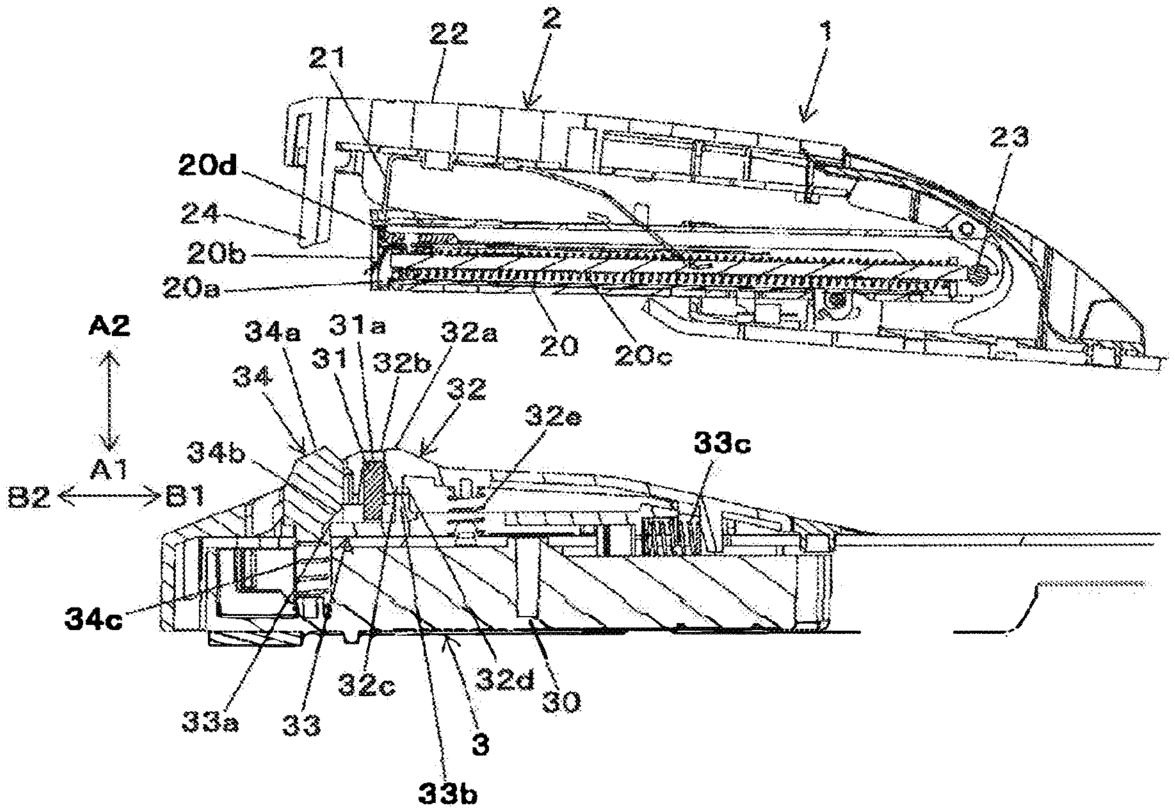
FIG. 1A is a side cross-sectional view of main parts showing an example of the stapler of the present embodiment.
Figure 1B:
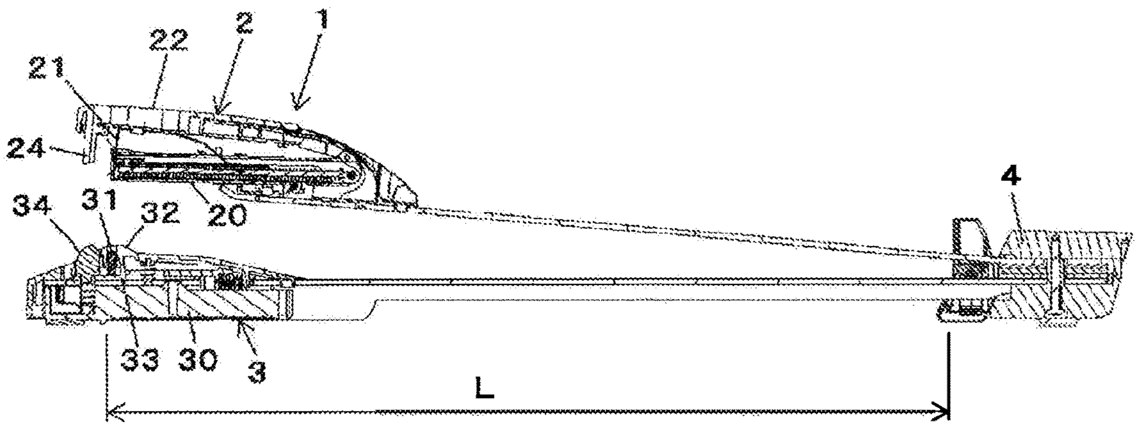
FIG. 1B is an entire side cross-sectional view showing the example of the stapler of the present embodiment.
Figure 1C:
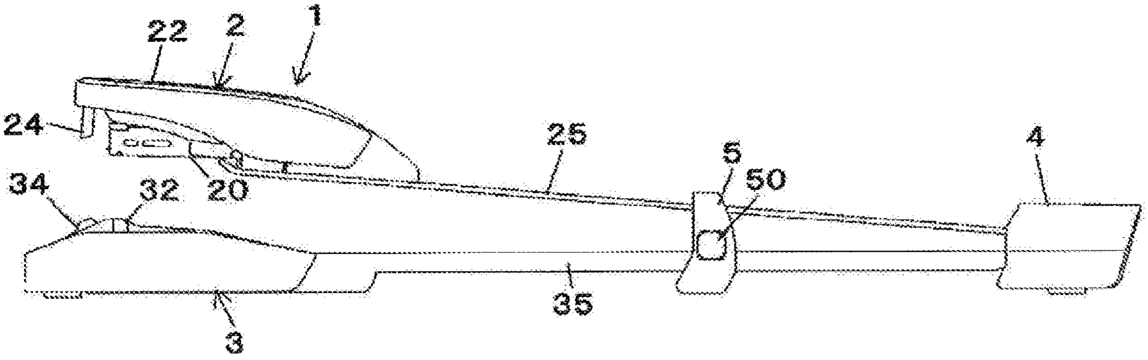
FIG. 1C is an entire side view showing the example of the stapler of the present embodiment.
Figure 1D:
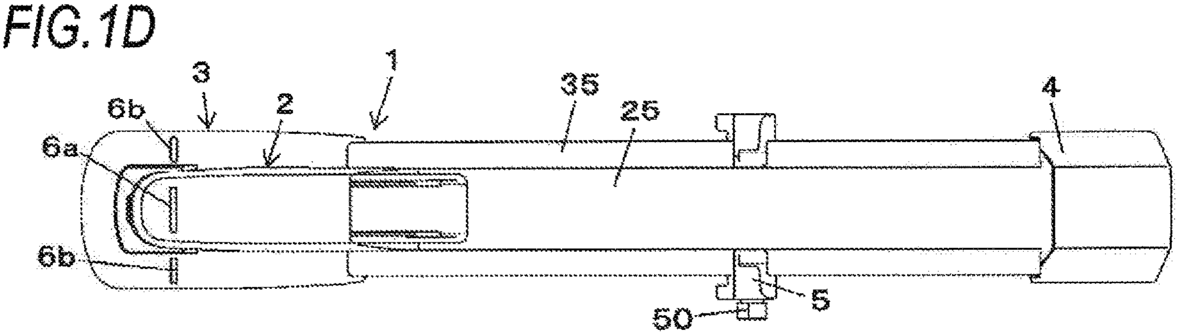
FIG. 1D is an entire top view showing the example of the stapler of the present embodiment.
Figure 1E:
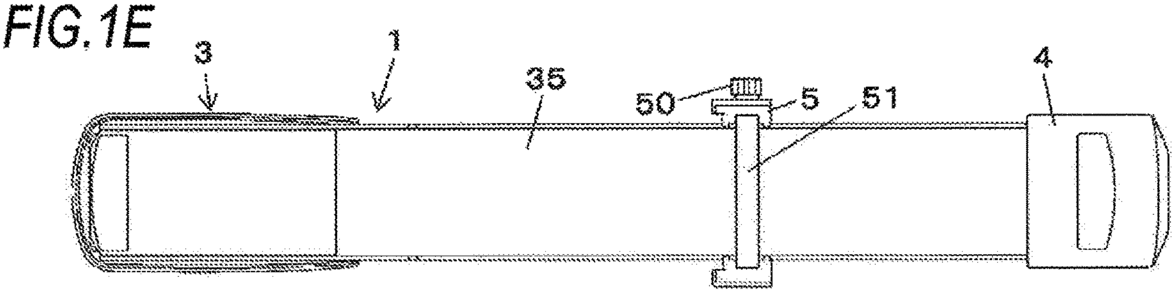
FIG. 1E is an entire bottom view showing the example of the stapler of the present embodiment.
Figure 1F:
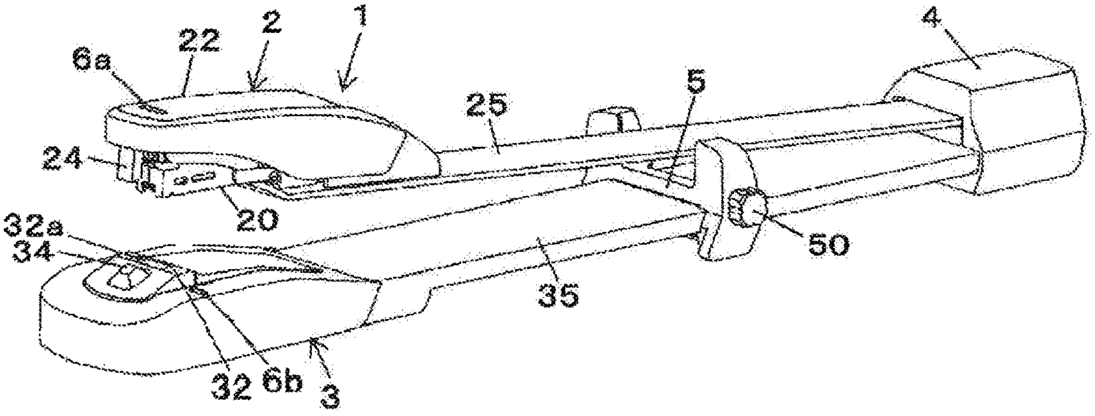
FIG. 1F is an entire perspective view showing the example of the stapler of the present embodiment.

FIG. 1A is a side cross-sectional view of main parts showing an example of the stapler of the present embodiment, and FIG. 1B is an entire side cross-sectional view showing the example of the stapler of the present embodiment. In addition, FIG. 1C is an entire side view showing the example of the stapler of the present embodiment, FIG. 1D is an entire top view showing the example of the stapler of the present embodiment, FIG. 1E is an entire bottom view showing the example of the stapler of the present embodiment, and FIG. 1F is an entire perspective view showing the example of the stapler of the present embodiment. Further, FIG. 2 shows an example of a staple that is used for the stapler of the present embodiment.

Figure 2:
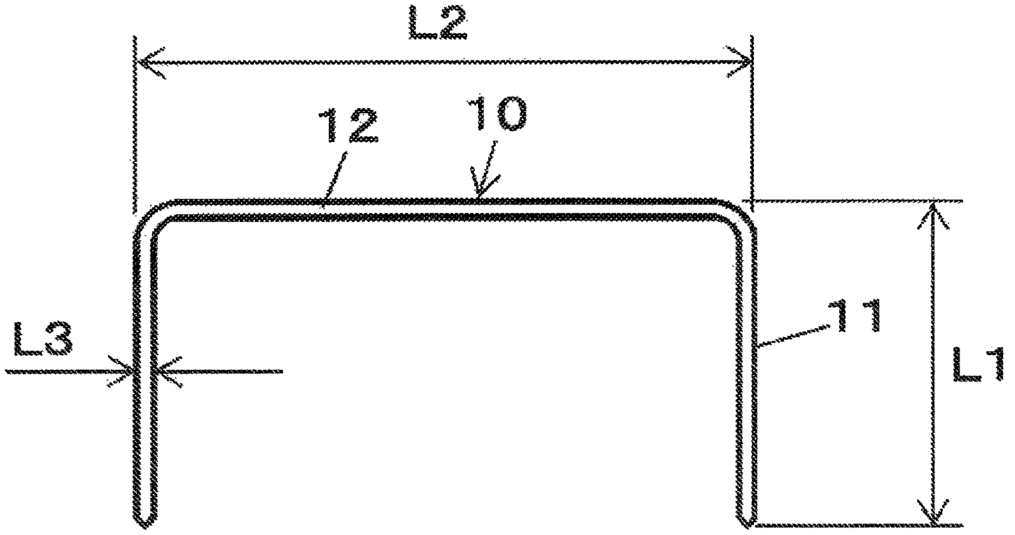
FIG. 2 shows an example of a staple that is used for the stapler of the present embodiment.

As for a staple 10 as shown in FIG. 2, known is a staple where a length L1 (outer dimension) of a staple leg 11 is 4.8 mm, a length L2 (outer dimension) of a staple shoulder portion 12 is 9.48 mm or less and a thickness L3 of each of the staple legs 11 and the staple shoulder portion 12 is 0.30 mm or more. The staple 10 having such dimensions corresponds to a staple called No. 10 prescribed by JIS (Japanese Industrial Standards). In addition, as for the staple 10, known is a staple where the length L1 (outer dimension) of the staple leg 11 is 6.0 mm, the length L2 (outer dimension) of the staple shoulder portion 12 is 12.97 mm or less and the thickness L3 of each of the staple legs 11 and the staple shoulder portion 12 is 0.45 mm or more. The staple 10 having such dimensions corresponds to a staple called No. 3 prescribed by JIS. Further, as for the staple 10, known is a staple where the length L1 (outer dimension) of the staple leg 11 is 6.0 mm, the length L2 (outer dimension) of the staple shoulder portion 12 is 11.49 mm or less and the thickness L3 of each of the staple legs 11 and the staple shoulder portion 12 is 0.30 mm or more.

A stapler 1 includes a staple striking-out unit 2 configured to strike out such staple 10, a staple leg bending unit 3 configured to bend a pair of staple legs 11 of the staple 10 struck out by the staple striking-out unit 2, and a connection unit (connector) 4 configured to connect the staple striking-out unit 2 and the staple leg bending unit 3 so as to be movable in directions of relatively coming close to and separating from each other.

In the stapler 1, the direction in which the staple striking-out unit 2 and the staple leg bending unit 3 come close to each other by relative movement is referred to as 'first direction' and a direction intersecting with the first direction is referred to as 'second direction'.

The staple striking-out unit 2 has a magazine 20 configured to accommodate the staple 10, a driver 21 configured to strike out the staple 10 accommodated in the magazine 20, and a handle part 22 configured to actuate the driver 21. In the staple striking-out unit 2, the magazine 20 and the handle part 22 are connected to be rotatable about a shaft 23 as a fulcrum.

The magazine 20 is configured so that a staple connecting body (not shown) consisting of a predetermined number of connected staples 10 can be accommodated therein, and has a staple striking-out port 20*a*, through which the staple 10 separated from the staple connecting body passes, at an end portion on a front side that is an opposite side to a side on which the shaft 23 is provided. In addition, the magazine 20 has a spring 20*c* for pressing the staple connecting body against a magazine front wall 20*b* via a pusher 20*d*.

The driver 21 is attached to the handle part 22, and is configured to move along the magazine front wall 20*b*, to separate one staple 10 from the staple connecting body, and to strike out the staple from the staple striking-out port 20*a*, as the handle part 22 rotates about the shaft 23 as a fulcrum.

The staple leg bending unit 3 includes a clincher 31 having a guide surface 31*a* for bending the staple legs 11. In addition, the staple leg bending unit 3 includes a clincher guide 32 having a sandwiching portion 32*a* configured to sandwich a sheet between the sandwiching portion and the magazine 20 of the staple striking-out unit 2, and an opening portion 32*b* for exposing the guide surface 31*a* of the clincher 31 to the sandwiching portion 32*a*. Further, the staple leg bending unit 3 includes a slider 33 configured to be movable between a first position where movement of the clincher guide 32 in the first direction is restricted and a second position where the restriction on the movement of the clincher guide in the first direction is released, and a clincher switch 34 configured to move the slider 33 to the second position.

The clincher 31 is attached to a base 30 of the staple leg bending unit 3 in such a form that the guide surface 31*a* having a groove of a shape for guiding the pair of staple legs 11 of the staple 10 in a direction of inwardly bending the staple legs is directed toward an upward direction, which is one direction facing the staple striking-out unit 2.

The clincher guide 32 has the sandwiching portion 32*a* provided facing the magazine 20 of the staple striking-out unit 2, and the opening portion 32*b* provided in the sandwiching portion 32*a* and facing the striking-out port 20*a* of the magazine 20.

The clincher guide 32 is supported with respect to the base 30 of the staple leg bending unit 3 so as to be movable in a direction of an arrow A1, which is the first direction, and a direction of an arrow A2, which is an opposite direction to the arrow A1, by a rotating operation or a linear operation, and is configured such that a distance between the sandwiching portion 32*a* and the guide surface 31*a* of the clincher 31 is displaced by movement in the first direction.

The slider 33 is an example of a clincher guide actuating member, and is supported with respect to the base 30 of the staple leg bending unit 3 so as to be movable in a direction of an arrow B1, which is the second direction intersecting with the first direction, and a direction of an arrow B2, which is an opposite direction to the arrow B1, by a linear operation.

The clincher switch 34 is provided on an opposite side to the connection unit 4 with the clincher 31 being interposed therebetween, and is supported with respect to the base 30 of the staple leg bending unit 3 so as to be movable in the direction of the arrow A1 (first direction) and the direction of the arrow A2 by a linear operation.

The clincher switch 34 has a pressed portion 34*a* protruding from the sandwiching portion 32*a* of the clincher guide 32 toward the staple striking-out unit 2 and configured to be pressed via a sheet, and an acting portion 34*b* configured to press the slider 33 in the direction of the arrow B1 (second direction) by an operation of the clincher switch 34 moving in the direction of the arrow A1. The acting portion 34*b* is constituted by an inclined surface inclined in a direction in which an upper side indicated by the arrow A2 is close to the slider 33 and a lower side indicated by the arrow A1 is away from the slider 33, with respect to the moving direction of the clincher switch 34 indicated by the arrows A1 and A2.

The slider 33 has an acted portion 33*a* configured to be pressed by the acting portion 34*b* of the clincher switch 34, and an engaging portion 33*b* configured to move along the direction of the arrows B1 and B2 by an operation of the slider 33 moving in the directions of the arrows B1 and B2.

The slider 33 has the acted portion 33*a* provided facing the acting portion 34*b* of the clincher switch 34 at one end portion along the moving direction indicated by the arrows B1 and B2. In addition, the slider 33 has the engaging portion 33*b* provided on a surface facing the clincher guide 32 and having a shape of protruding in the direction of the arrow A2 toward the clincher guide 32.

The clincher guide 32 has an engaged portion 32*c* configured to engage with the engaging portion 33*b* of the slider 33, and a retreat portion 32*d* into which the engaging portion 33*b* of the slider 33 enters.

The clincher guide 32 has the engaged portion 32*c* provided on a surface facing the slider 33 and having a shape of protruding in the direction of the arrow A1 toward the slider 33. In addition, the clincher guide 32 has the retreat portion 32*d* provided on a surface facing the slider 33, having a concave shape in the direction of the arrow A2, which is an opposite direction to the direction of the arrow A1 in which the engaged portion 32*c* protrudes, and provided adjacent to the engaged portion 32*c* along the direction of the arrow B1.

The clincher guide 32 is urged by a spring 32*e* in the direction of the arrow A2 in which the sandwiching portion 32*a* comes close to the staple striking-out unit 2. The slider 33 is urged by a spring 33*c* in the direction of the arrow B2 in which the acted portion 33*a* comes close to the acting portion 34*b* of the clincher switch 34. The clincher switch 34 is urged by a spring 34*c* in the direction of the arrow A2 in which the pressed portion 34*a* protrudes from the sandwiching portion 32*a* of the clincher guide 32 toward the staple striking-out unit 2.

A state where the clincher guide 32 is urged by the spring 32*e* in the direction of the arrow A2 in which the sandwiching portion 32*a* comes close to the staple striking-out unit 2 and the engaged portion 32*c* is engaged to the engaging portion 33*b* of the slider 33 is referred to as a standby position of the clincher guide 32. In a configuration where the clincher 31 is fixed at a predetermined position, in a state where the clincher guide 32 is at the standby position, the guide surface 31*a* of the clincher 31 is at a position retreating in the direction of the arrow A1 with respect to the sandwiching portion 32*a* of the clincher guide 32. The predetermined position where the clincher 31 is fixed is referred to as 'lower end position'. In addition, in a configuration where the clincher 31 is configured to be movable, in a state where the clincher 31 is urged in the direction of the arrow A2 by a spring (not shown) and the clincher guide 32 is at the standby position, the guide surface 31*a* is exposed on substantially the same surface as the sandwiching portion 32*a* of the clincher guide 32 and is pressed and can move in the direction of the arrow A1 by the staple legs 11 of the staple 10. In the configuration where the clincher 31 is configured to be movable, the clincher 31 is configured to be movable to the lower end position in the direction of the arrow A1.

A first position where the slider 33 is urged by the spring 33*c* in the direction of the arrow B2 in which the acted portion 33*a* comes close to the acting portion 34*b* of the clincher switch 34, the engaging portion 33*b* moves to a position facing the engaged portion 32*c* of the clincher guide 32 and is engaged to the engaged portion 32*c* and the movement of the clincher guide 32 in the first direction is restricted is referred to as a standby position of the slider 33.

A state where the clincher switch 34 is urged by the spring 34*c* in the direction of the arrow A2 in which the pressed portion 34*a* protrudes from the sandwiching portion 32*a* of the clincher guide 32 toward the staple striking-out unit 2 and the acting portion 34*b* does not press the acted portion 33*a* of the slider 33, in the present example, the acting portion 34*b* is separated from the acted portion 33*a* is referred to as a standby position of the clincher switch 34.

The staple striking-out unit 2 includes a pressing part 24 configured to actuate the clincher switch 34. The pressing part 24 has a shape of protruding toward the staple leg bending unit 3, and is provided to the handle part 22 while facing the pressed portion 34*a* of the clincher switch 34.

In the stapler 1, the staple striking-out unit 2 and the connection unit 4 are connected by a connecting member 25, and the staple leg bending unit 3 and the connection unit 4 are connected by a connecting member 35. In the stapler 1, in the present example, the connecting member 25 bends, so that the staple striking-out unit 2 and the staple leg bending unit 3 move in the directions of relatively coming close to and separating from each other. In the stapler 1, a distance L between the clincher 31, which is a binding position of the sheet, and the connection unit 4 is set so that the clincher 31 faces a vicinity of a center between one edge and the other edge of the sheet inserted between the staple striking-out unit 2 and the staple leg bending unit 3, so as to bind the sheet in a form of so-called saddle stitching. Further, the stapler 1 is not provided with a member that passes between the staple striking-out unit 2 and the staple leg bending unit 3 and transmits movement, between the clincher 31 and the connection unit 4.

The stapler 1 includes an insertion position restriction unit 5 configured to restrict an insertion position of a sheet. The insertion position restriction unit 5 is supported to be movable along the connecting member 35 in directions in which a distance from the position (binding position) of the clincher 31 shown in FIGS. 1A and 1B increases and decreases. By inserting a sheet to a position where it butts against the insertion position restriction unit 5, a distance from an edge of the sheet to the binding position can be specified.

The insertion position restriction unit 5 includes a dial 50 for fixing a position with respect to the connecting member 35. The dial 50 is configured to move an acting member 51, which is provided coaxially with a screw (not shown), connects left and right sides of the insertion position restriction unit 5 on a lower surface-side of the connecting member 35, and is configured to act one side part and the other side part of the connecting member 35, by fastening of the screw, thereby sandwiching the connecting member 35 from both left and right sides of the insertion position restriction unit 5. Thereby, the insertion position restriction unit 5 is fixed to and released from the connecting member 35 by operating one dial 50.

The stapler 1 has an alignment mark 6*a*, which indicates a target of a binding position and is provided on the staple striking-out unit 2, and an alignment mark 6*b* provided on the staple leg bending unit 3. The alignment mark 6*a* is constituted by providing, on the upper surface of the handle part 22, a three-dimensional notation by unevenness, a two-dimensional notation by printing, or the like in conformity to a position of the clincher 31 shown in FIGS. 1A and 1B. The alignment mark 6*b* is constituted by providing, on the upper surface of the base part 30 on both left and right sides of the clincher guide 32, a three-dimensional notation by unevenness, a two-dimensional notation by printing, or the like in conformity to a position of the clincher 31 shown in FIGS. 1A and 1B.

<Operation Example of Stapler of Present Embodiment>

Figure 3A:
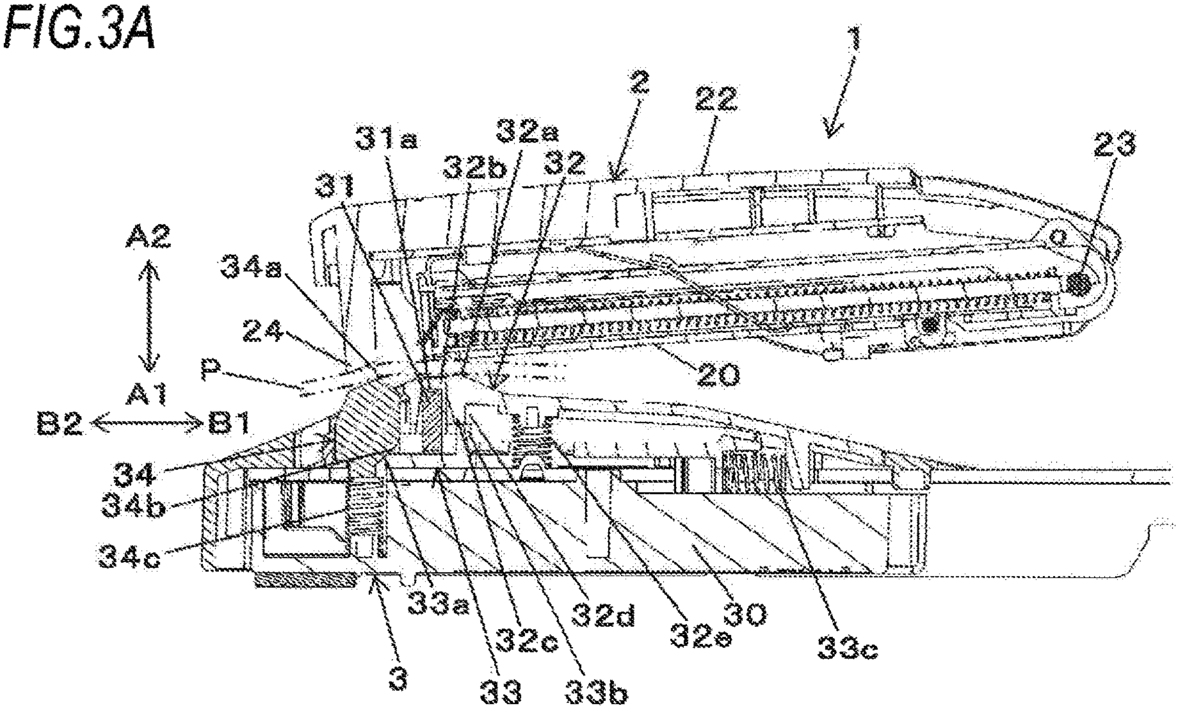
FIG. 3A is a side cross-sectional view of main parts showing an example of an operation of the stapler of the present embodiment.
Figure 3B:
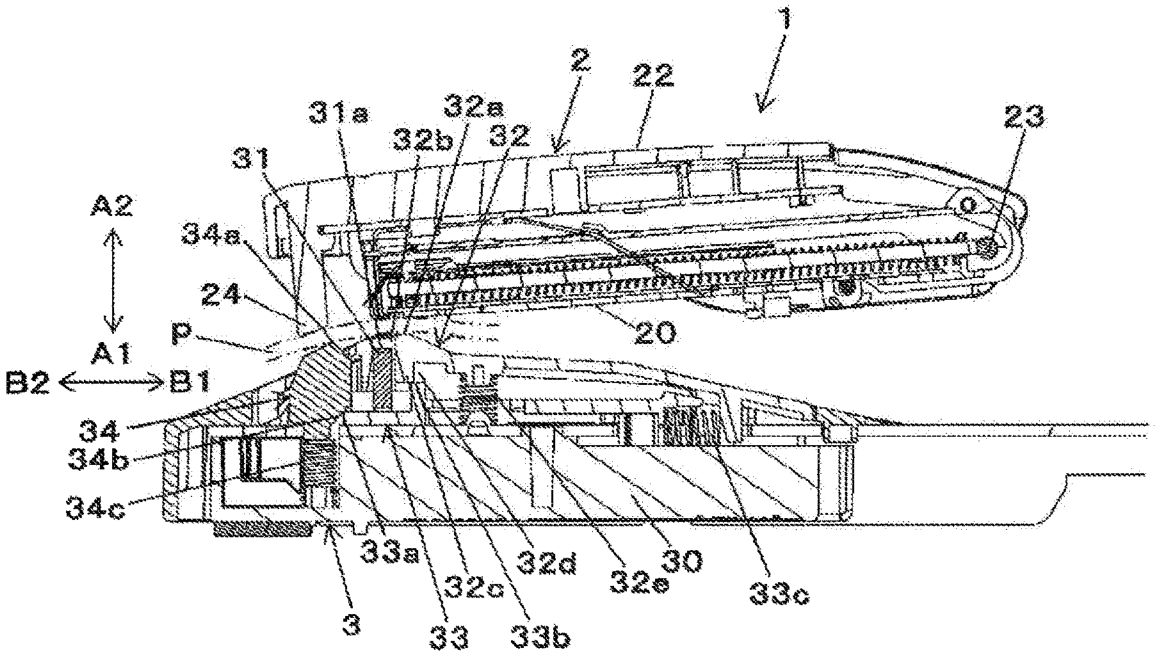
FIG. 3B is a side cross-sectional view of main parts showing the example of the operation of the stapler of the present embodiment.
Figure 3C:
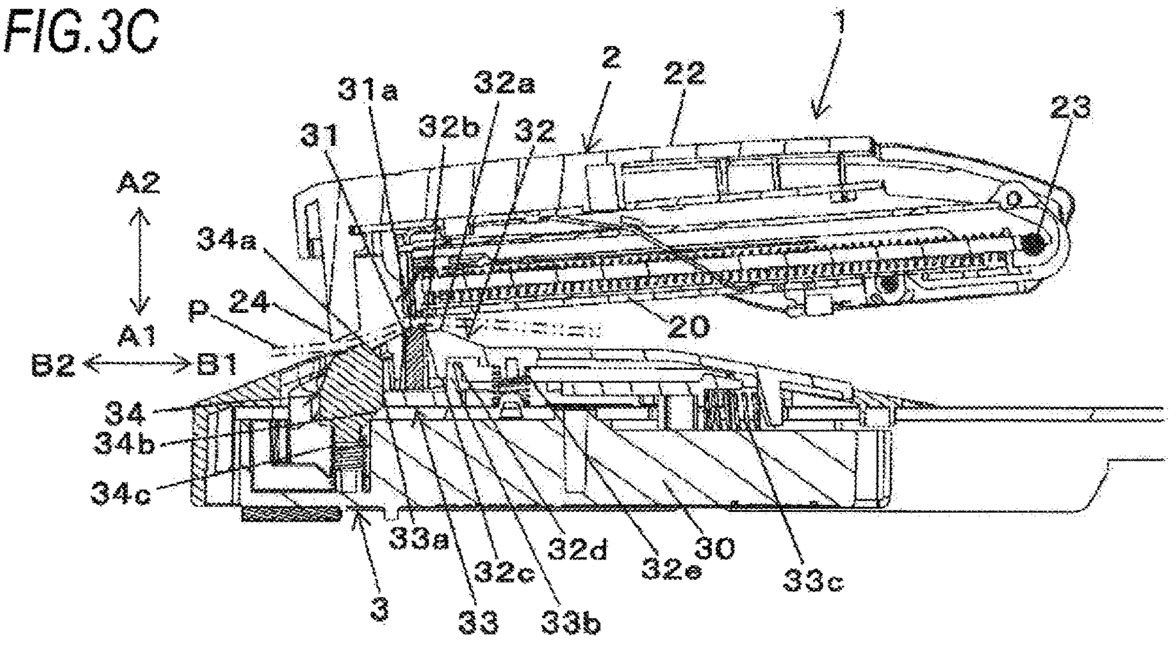
FIG. 3C is a side cross-sectional view of main parts showing the example of the operation of the stapler of the present embodiment.

FIGS. 3A to 3C are side cross-sectional view of main parts showing an example of an operation of the stapler of the present embodiment, and FIGS. 4A to 4E are front views of main parts showing the example of the operation of the stapler of the present embodiment.

In the stapler 1, when a sheet P is placed on the sandwiching portion 32*a*, the handle part 22 is pressed in the direction of the arrow A1 and the staple striking-out unit 2 moves toward the staple leg bending unit 3, the magazine 20 comes into contact with the sheet P. When the handle part 22 is further pressed in the direction of the arrow A1 in the state where the magazine 20 is in contact with the sheet P, the handle part 22 rotates with respect to the magazine 20 with the shaft 23 as a fulcrum, and the staple 10 accommodated in the magazine 20 is struck out from the staple striking-out port 20*a* by the driver 21. When the staple 10 is struck out from the staple striking-out port 20*a* in the state where the magazine 20 is in contact with the sheet P, the staple legs 11 penetrate through the sheet P. Then, the staple legs 11 penetrating through the sheet P enter the opening portion 32*b* of the clincher guide 32.

In a state where the staple legs 11 of the staple 10 struck out by the staple striking-out unit 2 penetrate through the sheet P sandwiched by the sandwiching portion 32*a* of the clincher guide 32 and the tip ends of the staple legs 11 after the penetration are in contact with the guide surface 31*a* of the clincher 31, the clincher 31 is located at the lower end position where the guide surface 31*a* is farthest from the sandwiching portion 32*a* along the direction of the arrow A1. The lower end position is a position where the tip ends of the staple legs 11 are in contact with the guide surface 31*a* and a gap L12 is formed between an upper surface of the sheet P sandwiched by the sandwiching portion 32*a* and the staple shoulder portion 12 of the staple 10. As the staple 10 is further struck out, the pair of staple legs 11 of the staple 10 are bent inwardly, the staple shoulder portion 12 comes into contact with the sheet P, and the staple shoulder portion 12 is pressed together with the sheet P in the direction of the arrow A1, so that the clincher guide 32 moves in a direction in which the sandwiching portion 32*a* comes close to the guide surface 31*a*.

In the below, the details of the above operation are described. A position where the slider 33 is at the standby position and the guide surface 31*a* of the clincher 31 is farthest along the direction of the arrow A1 from the sandwiching portion 32*a* of the clincher guide 32, which is restricted from moving by the slider 33 and therefore is located at the standby position as the engaging portion 33*b* of the slider 33 is engaged to the engaged portion 32*c* of the clincher guide 32, is referred to as the lower end position of the clincher 31.

Figure 4A:
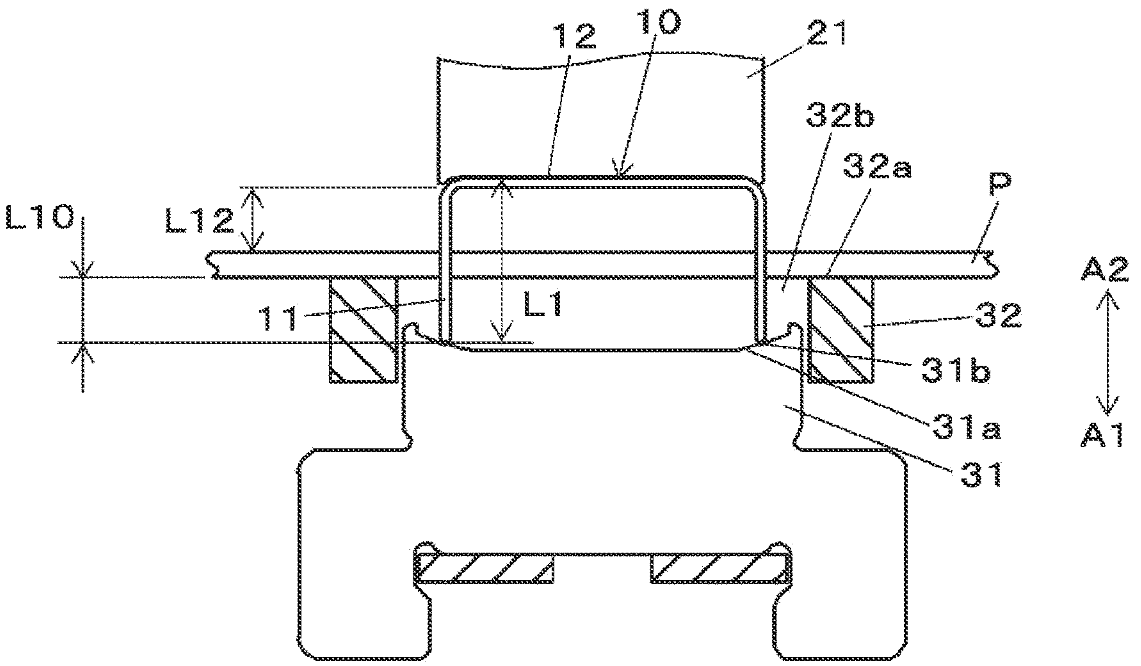
FIG. 4A is a front view of main parts showing the example of the operation of the stapler of the present embodiment.

In a case of a configuration where the clincher 31 is fixed at the lower end position, when a length between the driver 21 and the guide surface 31*a* becomes the same as the length L1 of the staple legs 11, the tip ends of the staple legs 11 come into contact with the guide surface 31*a*, as shown in FIG. 4A. The guide surface 31*a* is formed with an inwardly inclined portion 31*b* at a portion with which the tip ends of the staple legs 11 come into contact, so that the tip ends of the pair of staple legs 11 are guided inwardly each other.

In a case of a configuration where the clincher 31 is pressed by the staple legs 11 of the staple 10 and moves in the direction of the arrow A1, in a state where the tip ends of the staple legs 11 are in contact with the guide surface 31*a*, the clincher 31 moves to the lower end position, as shown in FIG. 4A.

In a state where the clincher 31 is at the lower end position and the tip ends of the staple legs 11 are in contact with the guide surface 31*a*, when the staple striking-out unit 2 further moves toward the staple leg bending unit 3, the length between the driver 21 and the guide surface 31*a* becomes shorter than the length of the staple legs 11. When the length between the driver 21 and the guide surface 31*a* becomes shorter than the length of the staple legs 11, the tip ends of the staple legs 11 are pressed against the guide surface 31*a*, and a force of bending the pair of staple legs 11 inwardly is applied.

In a state where the clincher guide 32 is at the standby position and does not yet start to move in the direction of the arrow A1, at a tip bending start timing of the staple legs 11 at which a force of bending the pair of staple legs 11 inwardly is applied, the length L10 between the guide surface 31*a* of the clincher 31 and the sandwiching portion 32*a* of the clincher guide 32 is less than the length of the staple legs 11.

At the above-described timing, the length L10 between the guide surface 31*a* of the clincher 31 and the sandwiching portion 32*a* of the clincher guide 32 is preferably 29% or more and 62% or less of the length L1 of the staple legs 11.

Specifically, in a case where the length of the staple legs 11 is 4.8 mm, the length L10 between the guide surface 31*a* of the clincher 31 and the sandwiching portion 32*a* of the clincher guide 32 at the above-described timing is preferably 1.2 mm or more and 2.4 mm or less, and more preferably 1.4 mm or more and 2.4 mm or less. In addition, in a case where the length of the staple legs 11 is 6.0 mm, the length L10 between the guide surface 31*a* of the clincher 31 and the sandwiching portion 32*a* of the clincher guide 32 at the above-described timing is preferably 1.6 mm or more and 3.7 mm or less, and more preferably 1.8 mm or more and 3.7 mm or less.

Note that, in the configuration where the clincher 31 is fixed at the lower end position, in the state where the clincher guide 32 and the slider 33 are at the standby positions and the engaging portion 33*b* of the slider 33 is engaged to the engaged portion 32*c* of the clincher guide 32, the guide surface 31*a* of the clincher 31 is at the position farthest from the sandwiching portion 32*a* of the clincher guide 32 along the direction of the arrow A1 and the length L10 between the inclined portion 31*b*, at which the staple is pressed and squashed, of the guide surface 31*a* of the clincher 31 and the sandwiching portion 32*a* of the clincher guide 32 satisfies the above value.

In the configuration where the clincher 31 is fixed at the lower end position, a configuration is made so that a gap L12 is formed, even in an operation of binding an allowed maximum number of sheets P, between the upper surface of the sheet P sandwiched by the sandwiching portion 32*a* of the clincher guide 32 and the staple shoulder portion 12 of the staple 10 at a time when the tip ends of the staple legs 11 penetrating through the sheet P reach the guide surface 31*a* of the clincher 31.

In addition, in the case of the configuration where the clincher 31 is pressed by the staple legs 11 of the staple 10, and therefore, moves in the direction of the arrow A1, in the state where the clincher guide 32 and the slider 33 are at the standby positions and the engaging portion 33*b* of the slider 33 is engaged to the engaged portion 32*c* of the clincher guide 32, when the clincher 31 is pressed in the direction of the arrow A1 and moves to the lower end position by the staple legs 11 of the staple 10, the guide surface 31*a* of the clincher 31 is at the position farthest from the sandwiching portion 32*a* of the clincher guide 32 along the direction of the arrow A1 and the length L10 between the inclined portion 31*b*, at which the staple is pressed and squashed, of the guide surface 31*a* of the clincher 31 and the sandwiching portion 32*a* of the clincher guide 32 satisfies the above value. Further, a configuration is made so that the gap L12 is formed, even in the operation of binding the allowed maximum number of sheets P, between the upper surface of the sheet P sandwiched by the sandwiching portion 32*a* of the clincher guide 32 and the staple shoulder portion 12 of the staple 10 at the above-described timing.

Figure 4B:
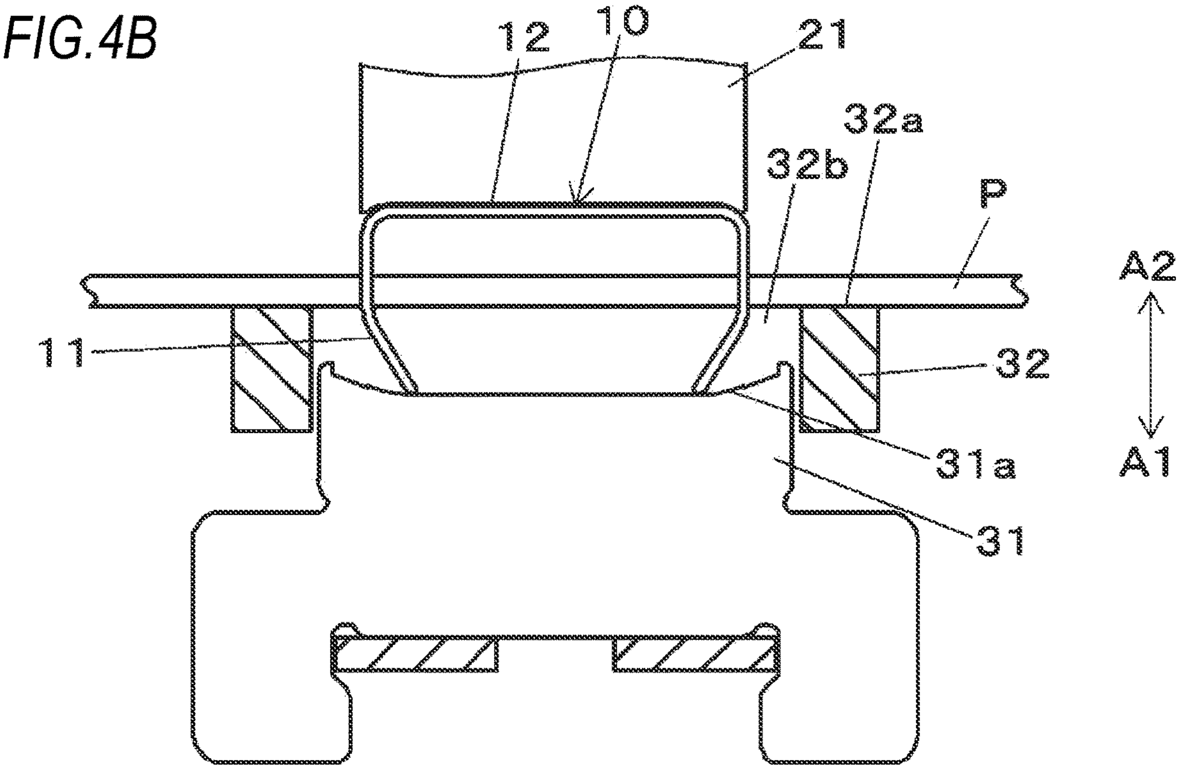
FIG. 4B is a front view of main parts showing the example of the operation of the stapler of the present embodiment.
Figure 4C:
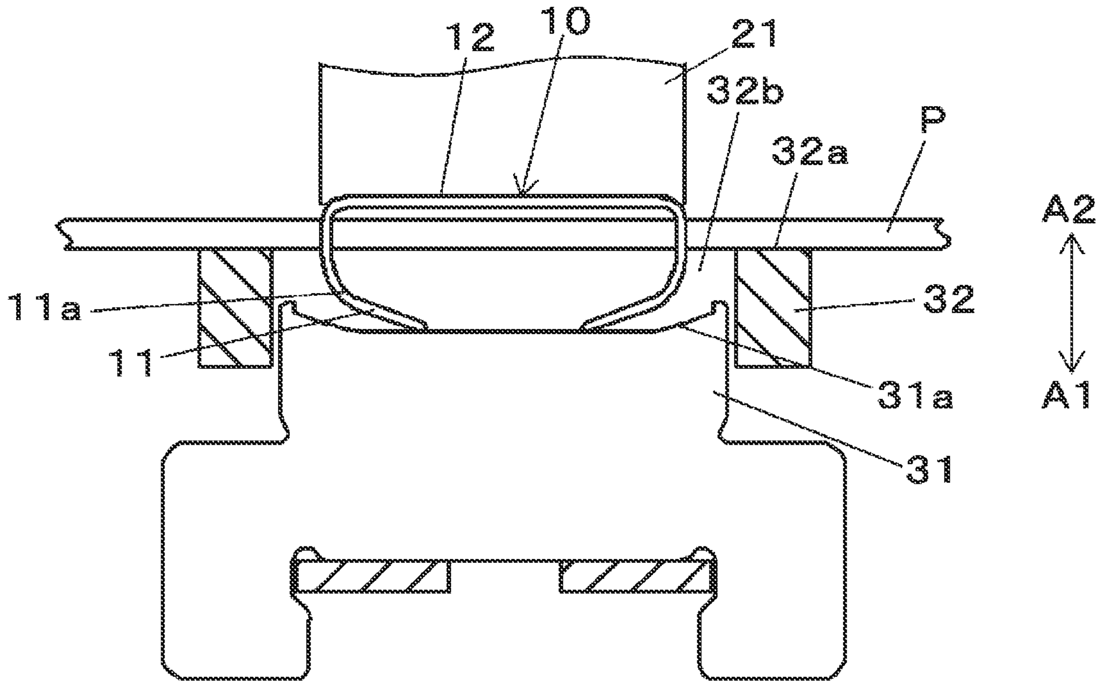
FIG. 4C is a front view of main parts showing the example of the operation of the stapler of the present embodiment.

When the handle part 22 is further pressed in the direction of arrow A1 and the staple striking-out unit 2 moves toward the staple leg bending unit 3, the staple legs 11 are pressed against the guide surface 31*a*, and as shown in FIGS. 4B and 4C, the pair of staple legs 11 is bent inwardly. In this tip bending process of bending the staple legs 11, since the clincher guide 32 is restricted from moving by the slider 33 and therefore is located at the standby position, the gap L12 formed between the upper surface of the sheet P sandwiched by the sandwiching portion 32*a* of the clincher guide 32 and the staple shoulder portion 12 of the staple 10 is reduced.

Further, in the stapler 1, when the handle part 22 is further pressed in the direction of the arrow A1 in the state where the magazine 20 is in contact with the sheet P, the pressing part 24 comes into contact with the sheet P and presses the pressed portion 34*a* of the clincher switch 34 via the sheet P in the direction of the arrow A1.

The clincher switch 34 is pressed via the sheet P by the pressing part 24, so that the clincher switch 34 moves in the direction of the arrow A1 while compressing the spring 34*c*. When the clincher switch 34 moves in the direction of the arrow A1, the acting portion 34*b* comes into contact with the acted portion 33*a* of the slider 33. Since the acting portion 34*b* is constituted by the inclined surface inclined in a predetermined direction, when the clincher switch 34 moves in the direction of the arrow A1 in the state where the acting portion 34*b* is in contact with the acted portion 33*a* of the slider 33, a force of pressing the acted portion 33*a* in the direction of arrow B1 is generated, and as shown in FIG. 3A, the slider 33 moves in the direction of arrow B1 while compressing the spring 33*c*.

Figure 4D:
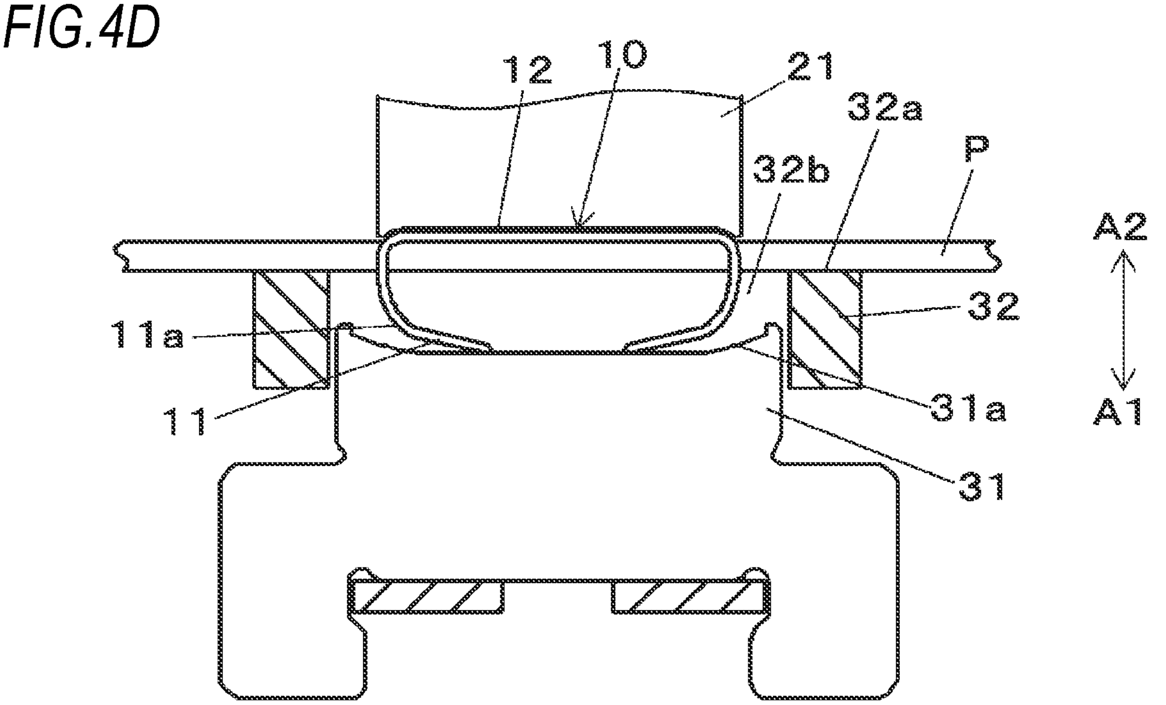
FIG. 4D is a front view of main parts showing the example of the operation of the stapler of the present embodiment.

When the slider 33 moves in the direction of the arrow B1, the engaging portion 33*b* moves from a position facing the engaged portion 32*c* of the clincher guide 32 to a position facing the retreat portion 32*d*. When the engaging portion 33*b* of the slider 33 moves to the position facing the retreat portion 32*d* of the clincher guide 32, the clincher guide 32 can move in the direction of the arrow A1. The movement of the slider 33 is made in conjunction with the operation of the staple striking-out unit 2 moving toward the staple leg bending unit 3. Until the staple striking-out unit 2 moves toward the staple leg bending unit 3 and therefore the upper surface of the sheet P sandwiched by the sandwiching portion 32*a* and the staple shoulder portion 12 of the staple 11 come into contact with each other, in the present example, as shown in FIG. 4D, when the upper surface of the sheet P sandwiched by the sandwiching portion 32*a* and the staple shoulder portion 12 of the staple 11 come into contact with each other, the engaging portion 33*b* of the slider 33 moves to the position facing the retreat portion 32*d* of the clincher guide 32.

Thereby, in the stapler 1, when the handle part 22 is further pressed in the direction of the arrow A1 in the state where the magazine 20 is in contact with the sheet P, as shown in FIG. 3C, the sandwiching portion 32*a* is pressed via the sheet P and the clincher guide 32 moves in the direction of the arrow A1 while compressing the spring 32*e*.

When the clincher guide 32 moves in the direction of the arrow A1, the sheet P and the staple 10 whose staple legs 11 penetrate through the sheet P move together with the clincher guide 32 in the direction of the arrow A1. Thereby, the staple legs 11 penetrating through the sheet P and having their tip sides bent inwardly each other are pressed against the guide surface 32*a* of the clincher guide 32 and are thus squashed, and are bent inwardly each other with the root portions protruding from the lower surface of the sheet P as a fulcrum.

Figure 4E:
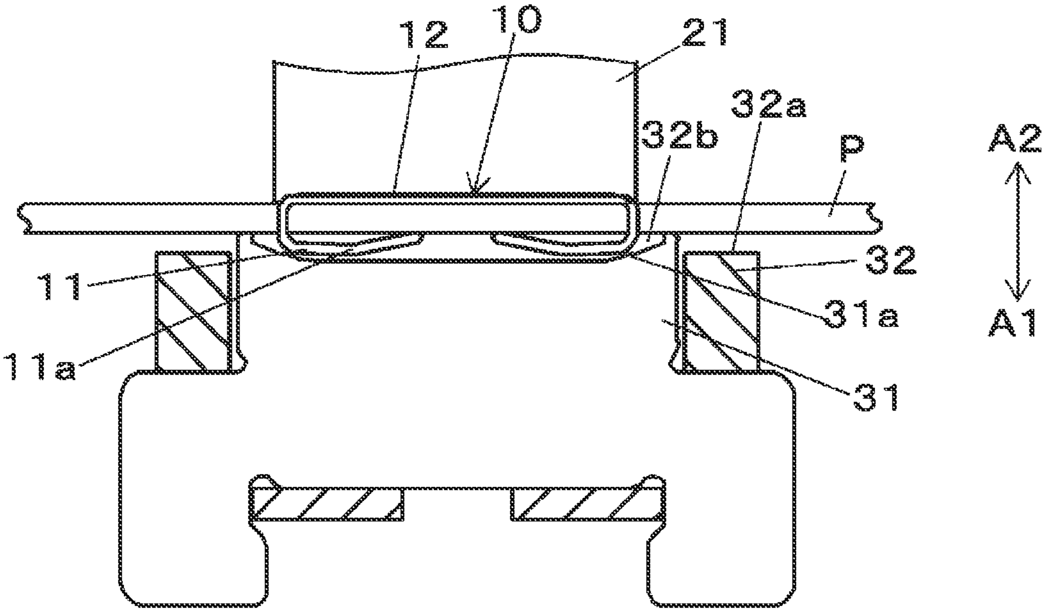
FIG. 4E is a front view of main parts showing the example of the operation of the stapler of the present embodiment.

Thereby, as shown in FIG. 4E, the sheet P is bound in such a form that the staple legs 11 penetrating through the sheet P extend along a back surface of the sheet P from the root portions protruding from the lower surface of the sheet P to bent portions 11*a* and farther tip ends-side than the bent portions 11*a* face toward the lower surface of the sheet P.

A relationship between the length of the staple legs and the binding form is shown in Tables 1 and 2 below.

TABLE 1

| Number of sheets to be bound | Less than 1.2 mm (less than lower limit value) | 1.2 mm (preferable lower limit value) | 1.4 mm (more preferable lower limit value) | 2.2 mm (more preferable upper limit value) | 2.4 mm (preferable upper limit value) | 3.4 mm (exceeding upper limit value) |
|---|---|---|---|---|---|---|
| 2 | Problem (staple legs make a hole in the sheet) | x (glasses-shaped clinch) | ○ (tip bending clinch) | ○ (tip bending clinch) | ○ (tip bending clinch) | |
| 3 | Problem (staple legs make a hole in the sheet) | x (glasses-shaped clinch) | ○ (tip bending clinch) | ○ (tip bending clinch) | ○ (tip bending clinch) | x (flat clinch) |
| 4 | Problem (staple legs make a hole in the sheet) | x (glasses-shaped clinch) | ○ (tip bending clinch) | ○ (tip bending clinch) | ○ (tip bending clinch) | x (flat clinch) |
| 5 | x (glasses-shaped clinch) | ○ (tip bending clinch) | ○ (tip bending clinch) | ○ (tip bending clinch) | ○ (tip bending clinch) | x (flat clinch) |
| 6 | x (glasses-shaped clinch) | ○ (tip bending clinch) | ○ (tip bending clinch) | ○ (tip bending clinch) | ○ (tip bending clinch) | x (flat clinch) |
| 7 | x (glasses-shaped clinch) | ○ (tip bending clinch) | ○ (tip bending clinch) | ○ (tip bending clinch) | ○ (tip bending clinch) | x (flat clinch) |
| 8 | x (glasses-shaped clinch) | ○ (tip bending clinch) | ○ (tip bending clinch) | ○ (tip bending clinch) | ○ (tip bending clinch) | x (flat clinch) |
| 9 | x (glasses-shaped clinch) | ○ (tip bending clinch) | ○ (tip bending clinch) | ○ (tip bending clinch) | ○ (tip bending clinch) | x (flat clinch) |
| 10 | x (glasses-shaped clinch) | ○ (tip bending clinch) | ○ (tip bending clinch) | ○ (tip bending clinch) | ○ (tip bending clinch) | x (flat clinch) |
| 11 | x (glasses-shaped clinch) | ○ (tip bending clinch) | ○ (tip bending clinch) | ○ (tip bending clinch) | ○ (tip bending clinch) | x (flat clinch) |
| 12 | x (glasses-shaped clinch) | ○ (tip bending clinch) | ○ (tip bending clinch) | ○ (tip bending clinch) | ○ (tip bending clinch) | x (flat clinch) |
| 13 | x (glasses-shaped clinch) | ○ (tip bending clinch) | ○ (tip bending clinch) | ○ (tip bending clinch) | x (flat clinch) | x (flat clinch) |
| 14 | x (glasses-shaped clinch) | ○ (tip bending clinch) | ○ (tip bending clinch) | ○ (tip bending clinch) | x (flat clinch) | x (flat clinch) |
| 15 | x (glasses-shaped clinch) | ○ (tip bending clinch) | ○ (tip bending clinch) | x (flat clinch) | x (flat clinch) | x (flat clinch) |
| 16 | x (glasses-shaped clinch) | ○ (tip bending clinch) | ○ (tip bending clinch) | x (flat clinch) | x (flat clinch) | x (flat clinch) |

TABLE 1-continued

| Number of sheets to be bound | Less than 1.2 mm (less than lower limit value) | 1.2 mm (preferable lower limit value) | 1.4 mm (more preferable lower limit value) | 2.2 mm (more preferable upper limit value) | 2.4 mm (preferable upper limit value) | 3.4 mm (exceeding upper limit value) |
|---|---|---|---|---|---|---|
| 17 | x (glasses-shaped clinch) | ○ (tip bending clinch) | ○ (tip bending clinch) | x (flat clinch) | x (flat clinch) | x (flat clinch) |
| 18 | x (glasses-shaped clinch) | ○ (tip bending clinch) | ○ (tip bending clinch) | x (flat clinch) | x (flat clinch) | x (flat clinch) |
| 19 | x (glasses-shaped clinch) | ○ (tip bending clinch) | ○ (tip bending clinch) | x (flat clinch) | x (flat clinch) | x (flat clinch) |
| 20 | x (glasses-shaped clinch) | ○ (tip bending clinch) | ○ (tip bending clinch) | x (flat clinch) | x (flat clinch) | x (flat clinch) |
| 21 | x (glasses-shaped clinch) | ○ (tip bending clinch) | ○ (tip bending clinch) | x (flat clinch) | x (flat clinch) | x (flat clinch) |
| 22 | x (glasses-shaped clinch) | ○ (tip bending clinch) | ○ (tip bending clinch) | x (flat clinch) | x (flat clinch) | x (flat clinch) |
| 23 | x (glasses-shaped clinch) | ○ (tip bending clinch) | x (flat clinch) | x (flat clinch) | x (flat clinch) | x (flat clinch) |
| 24 | x (glasses-shaped clinch) | ○ (tip bending clinch) | x (flat clinch) | x (flat clinch) | x (flat clinch) | x (flat clinch) |
| 25 | x (glasses-shaped clinch) | ○ (tip bending clinch) | x (flat clinch) | x (flat clinch) | x (flat clinch) | x (flat clinch) |

TABLE 2

| Number of sheets to be bound | Less than 1.6 mm (less than lower limit value) | 1.6 mm (preferable lower limit value) | 1.8 mm (more preferable lower limit value) | 2.7 mm (more preferable upper limit value) | 3.0 mm (preferable upper limit value) | 3.7 mm (upper limit value) | 4.4 mm (exceeding upper limit value) |
|---|---|---|---|---|---|---|---|
| 2 | Problem (staple legs make a hole in the sheet) | x (glasses-shaped clinch) | ○ (tip bending clinch) | ○ (tip bending clinch) | ○ (tip bending clinch) | ○ (tip bending clinch) | |
| 3 | Problem (staple legs make a hole in the sheet) | x (glasses-shaped clinch) | ○ (tip bending clinch) | ○ (tip bending clinch) | ○ (tip bending clinch) | ○ (tip bending clinch) | x (flat clinch) |
| 4 | Problem (staple legs make a hole in the sheet) | x (glasses-shaped clinch) | ○ (tip bending clinch) | ○ (tip bending clinch) | ○ (tip bending clinch) | ○ (tip bending clinch) | x (flat clinch) |
| 5 | x (glasses-shaped clinch) | ○ (tip bending clinch) | ○ (tip bending clinch) | ○ (tip bending clinch) | ○ (tip bending clinch) | ○ (tip bending clinch) | x (flat clinch) |
| 6 | x (glasses-shaped clinch) | ○ (tip bending clinch) | ○ (tip bending clinch) | ○ (tip bending clinch) | ○ (tip bending clinch) | ○ (tip bending clinch) | x (flat clinch) |
| 7 | x (glasses-shaped clinch) | ○ (tip bending clinch) | ○ (tip bending clinch) | ○ (tip bending clinch) | ○ (tip bending clinch) | ○ (tip bending clinch) | x (flat clinch) |
| 8 | x (glasses-shaped clinch) | ○ (tip bending clinch) | ○ (tip bending clinch) | ○ (tip bending clinch) | ○ (tip bending clinch) | ○ (tip bending clinch) | x (flat clinch) |
| 9 | x (glasses-shaped clinch) | ○ (tip bending clinch) | ○ (tip bending clinch) | ○ (tip bending clinch) | ○ (tip bending clinch) | ○ (tip bending clinch) | x (flat clinch) |
| 10 | x (glasses-shaped clinch) | ○ (tip bending clinch) | ○ (tip bending clinch) | ○ (tip bending clinch) | ○ (tip bending clinch) | x (flat clinch) | x (flat clinch) |
| 11 | x (glasses-shaped clinch) | ○ (tip bending clinch) | ○ (tip bending clinch) | ○ (tip bending clinch) | ○ (tip bending clinch) | x (flat clinch) | x (flat clinch) |

TABLE 2-continued

| Number of sheets to be bound | Less than 1.6 mm (less than lower limit value) | 1.6 mm (preferable lower limit value) | 1.8 mm (more preferable lower limit value) | 2.7 mm (more preferable upper limit value) | 3.0 mm (preferable upper limit value) | 3.7 mm (upper limit value) | 4.4 mm (exceeding upper limit value) |
|---|---|---|---|---|---|---|---|
| 12 | x (glasses-shaped clinch) | ○ (tip bending clinch) | ○ (tip bending clinch) | ○ (tip bending clinch) | ○ (tip bending clinch) | x (flat clinch) | x (flat clinch) |
| 13 | x (glasses-shaped clinch) | ○ (tip bending clinch) | ○ (tip bending clinch) | ○ (tip bending clinch) | ○ (tip bending clinch) | x (flat clinch) | x (flat clinch) |
| 14 | x (glasses-shaped clinch) | ○ (tip bending clinch) | ○ (tip bending clinch) | ○ (tip bending clinch) | ○ (tip bending clinch) | x (flat clinch) | x (flat clinch) |
| 15 | x (glasses-shaped clinch) | ○ (tip bending clinch) | ○ (tip bending clinch) | ○ (tip bending clinch) | ○ (tip bending clinch) | x (flat clinch) | x (flat clinch) |
| 16 | x (glasses-shaped clinch) | ○ (tip bending clinch) | ○ (tip bending clinch) | ○ (tip bending clinch) | ○ (tip bending clinch) | x (flat clinch) | x (flat clinch) |
| 17 | x (glasses-shaped clinch) | ○ (tip bending clinch) | ○ (tip bending clinch) | ○ (tip bending clinch) | ○ (tip bending clinch) | x (flat clinch) | x (flat clinch) |
| 18 | x (glasses-shaped clinch) | ○ (tip bending clinch) | ○ (tip bending clinch) | ○ (tip bending clinch) | x (flat clinch) | x (flat clinch) | x (flat clinch) |
| 19 | x (glasses-shaped clinch) | ○ (tip bending clinch) | ○ (tip bending clinch) | ○ (tip bending clinch) | x (flat clinch) | x (flat clinch) | x (flat clinch) |
| 20 | x (glasses-shaped clinch) | ○ (tip bending clinch) | ○ (tip bending clinch) | ○ (tip bending clinch) | x (flat clinch) | x (flat clinch) | x (flat clinch) |
| 21 | x (glasses-shaped clinch) | ○ (tip bending clinch) | ○ (tip bending clinch) | x (flat clinch) | x (flat clinch) | x (flat clinch) | x (flat clinch) |
| 22 | x (glasses-shaped clinch) | ○ (tip bending clinch) | ○ (tip bending clinch) | x (flat clinch) | x (flat clinch) | x (flat clinch) | x (flat clinch) |
| 23 | x (glasses-shaped clinch) | ○ (tip bending clinch) | ○ (tip bending clinch) | x (flat clinch) | x (flat clinch) | x (flat clinch) | x (flat clinch) |
| 24 | x (glasses-shaped clinch) | ○ (tip bending clinch) | ○ (tip bending clinch) | x (flat clinch) | x (flat clinch) | x (flat clinch) | x (flat clinch) |
| 25 | x (glasses-shaped clinch) | ○ (tip bending clinch) | ○ (tip bending clinch) | x (flat clinch) | x (flat clinch) | x (flat clinch) | x (flat clinch) |
| 26 | x (glasses-shaped clinch) | ○ (tip bending clinch) | ○ (tip bending clinch) | x (flat clinch) | x (flat clinch) | x (flat clinch) | x (flat clinch) |
| 27 | x (glasses-shaped clinch) | ○ (tip bending clinch) | ○ (tip bending clinch) | x (flat clinch) | x (flat clinch) | x (flat clinch) | x (flat clinch) |
| 28 | x (glasses-shaped clinch) | ○ (tip bending clinch) | ○ (tip bending clinch) | x (flat clinch) | x (flat clinch) | x (flat clinch) | x (flat clinch) |
| 29 | x (glasses-shaped clinch) | ○ (tip bending clinch) | ○ (tip bending clinch) | x (flat clinch) | x (flat clinch) | x (flat clinch) | x (flat clinch) |
| 30 | x (glasses-shaped clinch) | ○ (tip bending clinch) | x (flat clinch) | x (flat clinch) | x (flat clinch) | x (flat clinch) | x (flat clinch) |

In a case where the length of the staple legs 11 was 4.8 mm, as shown in Table 1, when the length L10 between the guide surface 31*a* of the clincher 31 and the sandwiching portion 32*a* of the clincher guide 32 at the above-described timing was 1.4 mm, the sheets P were bound in a form called tip bending clinch from 2 sheets to 22 sheets, which are the numbers of sheets to be bound. In addition, when the length L10 was 2.2 mm, the sheets P were bound in the form of tip bending clinch from 2 sheets to 14 sheets, which are the numbers of sheets to be bound. Note that, the sheet P is a PPC sheet 64 g/m$^2$(55 kg).

The tip bending clinch has such a form that the staple legs 11 are bent from the root portions penetrating through the sheet P and there are a substantially linear section where the staple legs 11 follows the sheet P and a substantially linear section where the staple legs 11 face toward the sheet P. Specifically, the bent portions 11*a* are formed between the root portions protruding from the lower surface of the sheet P and the tip ends of the staple legs 11 penetrating through the sheet P, and the sheet P is bound in such a form that the staple legs 11 penetrating through the sheet P are in close contact with the back surface of the sheet P from the root portions protruding from the lower surface of the sheet P to the bent portions 11*a* and farther tip ends-side than the bent portions 11*a* face toward the lower surface of the sheet P.

Thereby, in a case where the length of the staple legs 11 was 4.8 mm, if the allowed maximum number of sheets P to be bound was set to about 14 sheets, when the length L10 between the guide surface 31*a* of the clincher 31 and the sandwiching portion 32*a* of the clincher guide 32 at the above-described timing was 1.4 mm or more and 2.2 mm or less, the sheets P were bound in the form of tip bending clinch.

In contrast, when the length L10 between the guide surface 31*a* of the clincher 31 and the sandwiching portion 32*a* of the clincher guide 32 at the above-described timing was 1.2 mm, the sheets P were bound in the form of tip bending clinch if the number of sheets P to be bound was large within the range of the allowed maximum number of sheets. On the other hand, if the number of sheets P to be bound was small, the sheets P tended to be bound in a form called glasses-shaped clinch, and in the present example, when the number of sheets P to be bound was 4 sheets or less, the sheets P were bound in the form of glasses-shaped clinch. The glasses-shaped clinch is such a form that the staple legs 11 are bent from the root portions penetrating through the sheet P and the tip ends are curved toward the sheet P.

In addition, when the length L10 between the guide surface 31*a* of the clincher 31 and the sandwiching portion 32*a* of the clincher guide 32 at the above-described timing was less than 1.2 mm, the sheets P were bound in the form of glasses-shaped clinch even if the number of sheets P to be bound was large within the range of the allowed maximum number of sheets. Further, when the number of sheets P to be bound was 4 sheets or less, a problem occurred in which the tip ends of the staple legs 11 bent on the lower surface-side of the sheet P penetrate the upper surface-side of the sheet P.

From the above, it was found that, in the case where the length of the staple legs 11 was 4.8 mm, in order to bind the sheets P in the form of tip binding clinch from the minimum number of sheets to be bound (2 sheets), the lower limit value of the length L10 between the guide surface 31*a* of the clincher 31 and the sandwiching portion 32*a* of the clincher guide 32 at the above-described timing was preferably 1.2 mm, and more preferably 1.4 mm.

On the other hand, when the length L10 between the guide surface 31*a* of the clincher 31 and the sandwiching portion 32*a* of the clincher guide 32 at the above-described timing exceeded 2.2 mm, the number of sheets P to be bound in the form of tip bending clinch tended to decrease, and when the length L10 was 2.4 mm, the sheets P were bound in the form of tip bending clinch from 2 sheets to 12 sheets, which are the number of sheets to be bound, and the sheets P were bound in a form called flat clinch when the number of sheets to be bound exceeded 12 sheets. The flat clinch is such a form that the staple legs 11 are bent from the root portions penetrating through the sheet P and are linear toward the tip ends along the sheet P. Note that, when the length L10 was 3.4 mm, if the number of sheets to be bound was 2 sheets, the sheets P were bound in the form of tip bending clinch, but if the number of sheets to be bound exceeded 2 sheets, the sheets P were bound in the form called flat clinch.

From the above, it was found that, in the case where the length of the staple legs 11 was 4.8 mm, in order to bind the sheets P in the form of tip binding clinch, if the allowed maximum number of sheets to be bound was 12 sheets, the upper limit value of the length L10 between the guide surface 31*a* of the clincher 31 and the sandwiching portion 32*a* of the clincher guide 32 at the above-described timing was preferably 2.4 mm. In addition, it was found that, if the allowed maximum number of sheets to be bound was 14 sheets, the upper limit value of the length L10 between the guide surface 31*a* of the clincher 31 and the sandwiching portion 32*a* of the clincher guide 32 at the above-described timing was more preferably 2.2 mm, considering that the length L10 is 2.2 mm and the maximum number of sheets to be bound is to be increased.

In a case where the length of the staple legs 11 was 6.0 mm, as shown in Table 2, when the length L10 between the guide surface 31*a* of the clincher 31 and the sandwiching portion 32*a* of the clincher guide 32 at the above-described timing was 1.8 mm, the sheets P were bound in the form of tip bending clinch from 2 sheets to 29 sheets, which are the numbers of sheets to be bound. In addition, when the length L10 was 2.7 mm, the sheets P were bound in the form of tip bending clinch from 2 sheets to 20 sheets, which are the numbers of sheets to be bound.

Thereby, in a case where the length of the staple legs 11 was 6.0 mm, if the allowed maximum number of sheets P to be bound was set to about 20 sheets, when the length L10 between the guide surface 31*a* of the clincher 31 and the sandwiching portion 32*a* of the clincher guide 32 at the above-described timing was 1.8 mm or more and 2.7 mm or less, the sheets P were bound in the form of tip bending clinch.

In contrast, when the length L10 between the guide surface 31*a* of the clincher 31 and the sandwiching portion 32*a* of the clincher guide 32 at the above-described timing was 1.6 mm, the sheets P were bound in the form of tip bending clinch if the number of sheets P to be bound was large within the range of the allowed maximum number of sheets. On the other hand, if the number of sheets P to be bound was small, the sheets P tended to be bound in the form of glasses-shaped clinch, and in the present example, when the number of sheets P to be bound was 4 sheets or less, the sheets P were bound in the form of glasses-shaped clinch.

In addition, when the length L10 between the guide surface 31*a* of the clincher 31 and the sandwiching portion 32*a* of the clincher guide 32 at the above-described timing was less than 1.6 mm, the sheets P were bound in the form of glasses-shaped clinch even if the number of sheets P to be bound was large within the range of the allowed maximum number of sheets. Further, when the number of sheets P to be bound was 4 sheets or less, a problem occurred in which the tip ends of the staple legs 11 bent on the lower surface-side of the sheet P penetrate the upper surface-side of the sheet P.

From the above, it was found that, in the case where the length of the staple legs 11 was 6.0 mm, in order to bind the sheets P in the form of tip binding clinch from the minimum number of sheets to be bound (2 sheets), the lower limit value of the length L10 between the guide surface 31*a* of the clincher 31 and the sandwiching portion 32*a* of the clincher guide 32 at the above-described timing was preferably 1.6 mm, and more preferably 1.8 mm.

On the other hand, when the length L10 between the guide surface 31*a* of the clincher 31 and the sandwiching portion 32*a* of the clincher guide 32 at the above-described timing exceeded 2.7 mm, the number of sheets P to be bound in the form of tip bending clinch tended to decrease, and when the length L10 was 3.0 mm, the sheets P were bound in the form of tip bending clinch from 2 sheets to 17 sheets, which are the number of sheets to be bound, and the sheets P were bound in the form called flat clinch when the number of sheets to be bound exceeded 17 sheets. In addition, when the length L10 was 3.7 mm, the sheets P were bound in the form of tip bending clinch from 2 sheets to 9 sheets, which are the number of sheets to be bound, and if the number of sheets to be bound exceeded 9 sheets, the sheets P were bound in the form called flat clinch. Note that, when the length L10 was 4.4 mm, if the number of sheets to be bound was 2 sheets, the sheets P were bound in the form of tip bending clinch, but if the number of sheets to be bound exceeded 2 sheets, the sheets P were bound in the form called flat clinch.

From the above, it was found that, in the case where the length of the staple legs 11 was 6.0 mm, in order to bind the sheets P in the form of tip binding clinch, if the allowed maximum number of sheets to be bound was 9 sheets, the upper limit value of the length L10 between the guide surface 31*a* of the clincher 31 and the sandwiching portion 32*a* of the clincher guide 32 at the above-described timing was preferably 3.7 mm. In addition, it was found that, if the allowed maximum number of sheets to be bound was 17 sheets, when the length L10 between the guide surface 31*a* of the clincher 31 and the sandwiching portion 32*a* of the clincher guide 32 at the above-described timing was 3.0 mm and the allowed maximum number of sheets to be bound was 20 sheets, the upper limit value of the length L10 was more preferably 2.7 mm, considering that the length L10 is 2.7 mm and the allowed maximum number of sheets to be bound is to be increased.

Note that, a member that passes between the staple striking-out unit 2 and the staple leg bending unit 3 and transmits movement is not provided between the clincher 31 and the connection unit 4. Thereby, a distance L between the clincher 31, which is a binding position of the sheet, and the connection unit 4 can be set so that the clincher 31 faces a vicinity of a center between one edge and the other edge of the sheet inserted between the staple striking-out unit 2 and the staple leg bending unit 3. Therefore, the sheet P can be bound in a form of so-called saddle stitching and tip bending clinch.

Figure 5A:
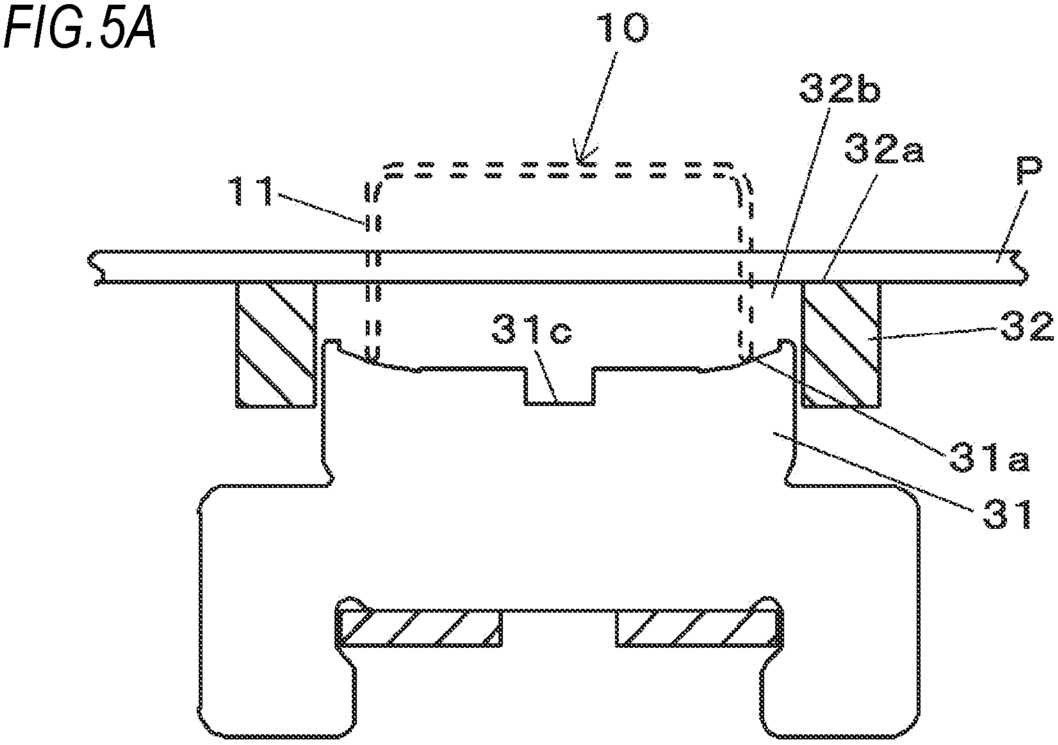
FIG. 5A is a front view of main parts of the stapler showing a modified embodiment of a clincher.
Figure 5B:
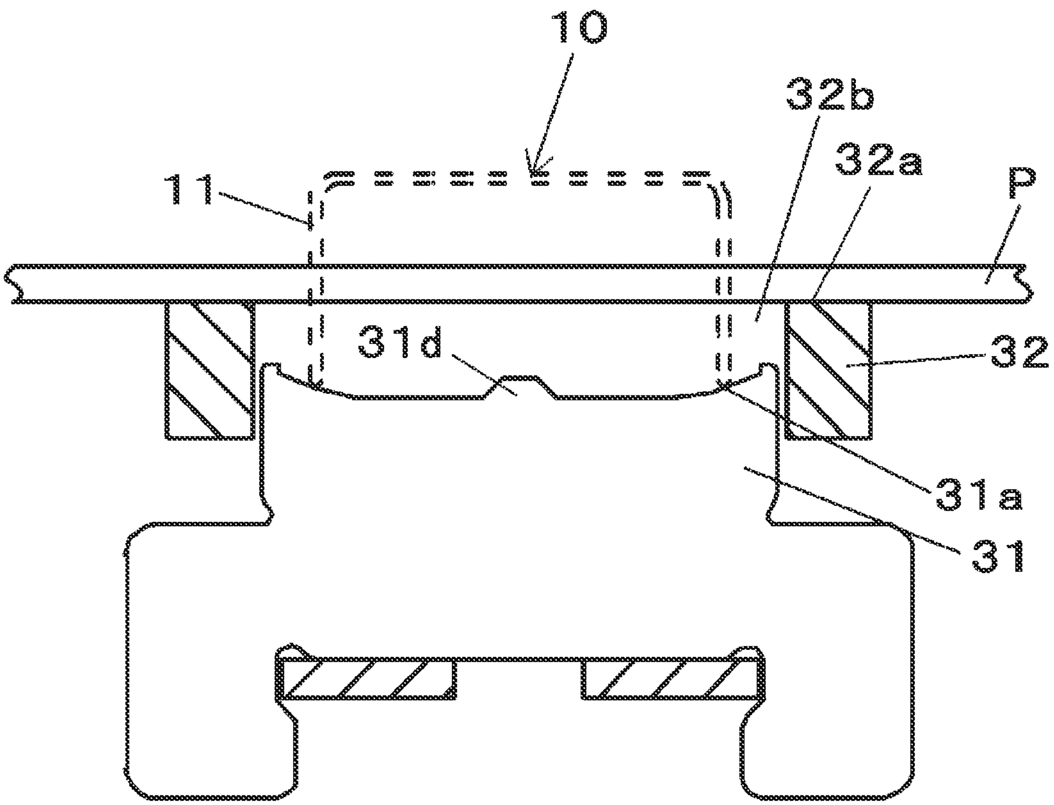
FIG. 5B is a front view of main parts of the stapler showing a modified embodiment of the clincher.

FIGS. 5A and 5B are front views of main parts of the stapler showing modified embodiments of the clincher. As shown in FIG. 5A, the clincher 31 may have a concave portion 31*c* concave in a direction away from the staple striking-out unit 2 shown in FIG. 1A or the like or a convex portion 31*d* protruding toward the staple striking-out unit 2, near a center of the guide surface 31*a* along a direction of guiding the staple legs 11*a*.

EXPLANATION OF REFERENCE

1: stapler, 2: staple striking-out unit, 20: magazine, 20*a*: staple striking-out port, 20*b*: magazine front wall, 20*c*: spring, 21: driver, 22: handle part, 23: shaft, 24: pressing part, 3: staple leg bending unit, 30: base, 31: clincher, 31*a*: guide surface, 32: clincher guide, 32*a*: sandwiching portion, 32*b*: opening portion, 32*c*: engaged portion, 32*d*: retreat portion, 32*e*: spring, 33: slider (clincher guide actuating member), 33*a*: acted portion, 33*b*: engaging portion, 33*c*: spring, 34: clincher switch, 34*a*: pressed portion, 34*b*: acting portion, 34*c*: spring, 4: connection unit (connector), 10: staple, 11: staple leg, 11*a*: bent portion, 12: staple shoulder portion, 31*b*: inclined portion, L1: length of staple leg, L12: gap, A1, A2: first direction

What is claimed is:

1. A stapler comprising:

a staple striking-out unit configured to strike out a staple having a pair of staple legs and a staple shoulder portion connecting end portions of the pair of staple legs to each other, the staple striking-out unit including a driver and a magazine;

a staple leg bending unit configured to bend the staple legs of the staple struck out by the staple striking-out unit; and a connector configured to connect the staple striking-out unit and the staple leg bending unit to be movable in directions of relatively approaching and separating from each other, wherein the staple leg bending unit comprises:

a clincher having a guide surface for bending the staple legs, and a clincher guide having a sandwiching portion configured to sandwich a sheet between the sandwiching portion and the staple striking-out unit and an opening portion for exposing the guide surface, the clincher guide being supported to be movable in a first direction to displace a distance between the guide surface and the sandwiching portion, wherein the clincher is located at a lower end position where the guide surface is farthest from the sandwiching portion in the first direction, in a state where the staple struck out by the staple striking-out unit penetrates through the sheet sandwiched by the sandwiching portion and tip ends of the staple legs after penetration are in contact with the guide surface, wherein the lower end position is a position where the tip ends of the staple legs are in contact with the guide surface and a gap is formed between an upper surface of the sheet sandwiched by the sandwiching portion and the staple shoulder portion of the staple, wherein the guide surface includes inclined portions positioned at both sides of the guide surface in a width direction of the clincher and inwardly inclining at a portion which comes into contact with the tip ends of the staple legs, and a central portion extending between the inclined portions in the width direction, the inclined portions being inclined relative to the central portion, wherein as the staple striking-out unit strikes out the staple, the staple striking- out unit bends the tip ends of the pair of the staple legs inwardly along the inclined portions to move the tip ends of the staple legs along the central portion, while pressing the staple shoulder portion together with the sheet in the first direction such that the staple shoulder portion comes into contact with the sheet, wherein after the staple shoulder portion is pressed together with the sheet in the first direction by the staple striking-out unit, as the sandwiching portion moves in a direction of approaching the guide surface, the clincher inwardly bends root portions of the staple legs protruding from a lower surface of the sheet, so that portions of the staple legs bent along the inclined portions are separated from the central portion, wherein with the guide surface located at the lower end position with respect to the sandwiching portion and a length of the staple legs is 4.8 mm, a distance between the guide surface and the sandwiching portion is 1.4 mm or more and 2.4 mm or less, and wherein the staple leg bending unit further comprises:

a slider configured to be moved in a second direction between a first position for restricting movement of the clincher guide and a second position for allowing movement of the clincher guide; and a clincher switch protruding from the sandwiching portion at a location further from the connector than the guide surface in the second direction, the clincher switch being configured to be depressed to move the slider from the first position to the second position.

2. The stapler according to claim 1, wherein the clincher is fixed at the lower end position to a part of the staple leg bending unit that is different from the clincher.

3. The stapler according to claim 1, wherein the clincher is supported by a part of the staple leg bending unit that is different from the clincher so as to be movable to the lower end position along the first direction.

4. The stapler according to claim 1, wherein the driver is configured to move along a front wall of the magazine to strike out the staple.

5. A stapler comprising:

a staple striking-out unit configured to strike out a staple having a pair of staple legs and a staple shoulder portion connecting end portions of the pair of staple legs each other, the staple striking-out unit including a driver and a magazine;

a staple leg bending unit configured to bend the staple legs of the staple struck out by the staple striking-out unit; and a connector configured to connect the staple striking-out unit and the staple leg bending unit to be movable in directions of relatively approaching and separating from each other, wherein the staple leg bending unit comprises:

a clincher having a guide surface for bending the staple legs, and a clincher guide having a sandwiching portion configured to sandwich a sheet between the sandwiching portion and the staple striking-out unit and an opening portion for exposing the guide surface, the clincher guide being supported to be movable in a first direction to displace a distance between the guide surface and the sandwiching portion, wherein the clincher is located at a lower end position where the guide surface is farthest from the sandwiching portion in the first direction, in a state where the staple struck out by the staple striking-out unit penetrates through the sheet sandwiched by the sandwiching portion and tip ends of the staple legs after penetration are in contact with the guide surface, wherein the lower end position is a position where the tip ends of the staple legs are in contact with the guide surface and a gap is formed between an upper surface of the sheet sandwiched by the sandwiching portion and the staple shoulder portion of the staple, wherein the guide surface includes inclined portions positioned at both sides of the guide surface in a width direction of the clincher and inwardly inclining at a portion which comes into contact with the tip ends of the staple legs, and a central portion extending between the inclined portions in the width direction, the inclined portions being inclined relative to the central portion, wherein as the staple striking-out unit strikes out the staple, the staple striking- out unit bends the tip ends of the pair of the staple legs inwardly along the inclined portions to move the tip ends of the staple legs along the central portion, while pressing the staple shoulder portion together with the sheet in the first direction such that the staple shoulder portion comes into contact with the sheet, wherein after the staple shoulder portion is pressed together with the sheet in the first direction by the staple striking-out unit, as the sandwiching portion moves in a direction of approaching the guide surface, the clincher inwardly bends root portions of the staple legs protruding from a lower surface of the sheet, so that portions of the staple legs bent along the inclined portions are separated from the central portion, wherein with the guide surface located at the lower end position with respect to the sandwiching portion and a length of the staple legs is 6.0 mm, a distance between the guide surface and the sandwiching portion is 1.8 mm or more and 3.7 mm or less, and wherein the staple leg bending unit further comprises:

a slider configured to be moved in a second direction between a first position for restricting movement of the clincher guide and a second position for allowing movement of the clincher guide; and a clincher switch protruding from the sandwiching portion at a location further from the connector than the guide surface in the second direction, the clincher switch being configured to be depressed to move the slider from the first position to the second position.

* * * * *